(12) United States Patent
Poturnak et al.

(10) Patent No.: US 12,284,170 B2
(45) Date of Patent: Apr. 22, 2025

(54) DAY ZERO USER ACCESS TO ENTERPRISE RESOURCES

(71) Applicant: Omnissa, LLC, Mountain View, CA (US)

(72) Inventors: Nikolay Poturnak, Palo Alto, CA (US); Gourav Mukherjee, Bangalore (IN); Jagjit Singh Sethi, Sunnyvale, CA (US); Anshul Sharma, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 314 days.

(21) Appl. No.: 17/469,942

(22) Filed: Sep. 9, 2021

(65) Prior Publication Data
US 2023/0016358 A1    Jan. 19, 2023

(30) Foreign Application Priority Data
Jul. 14, 2021   (IN) .............................. 202141031667

(51) Int. Cl.
| | |
|---|---|
| *H04L 29/06* | (2006.01) |
| *G06F 3/0482* | (2013.01) |
| *G06Q 10/105* | (2023.01) |
| *H04L 9/40* | (2022.01) |

(52) U.S. Cl.
CPC .......... *H04L 63/083* (2013.01); *G06F 3/0482* (2013.01); *G06Q 10/105* (2013.01)

(58) Field of Classification Search
CPC .... H04L 63/083; G06F 3/0482; G06Q 10/105
See application file for complete search history.

(56) References Cited

U.S. PATENT DOCUMENTS

| | | | |
|---|---|---|---|
| 9,990,786 B1* | 6/2018 | Ziraknejad | G06F 21/45 |
| 10,956,383 B2* | 3/2021 | Stuntebeck | G06F 16/215 |
| 2017/0064549 A1* | 3/2017 | Rykowski | H04L 67/34 |
| 2017/0126661 A1* | 5/2017 | Brannon | H04L 63/0815 |
| 2018/0343539 A1* | 11/2018 | Oppenheim | H04L 69/28 |
| 2018/0351957 A1* | 12/2018 | Mott | H04L 63/20 |
| 2020/0233389 A1* | 7/2020 | Ma | G06Q 10/087 |
| 2021/0099868 A1* | 4/2021 | Damlaj | H04L 67/146 |
| 2021/0226812 A1* | 7/2021 | Park | G06F 16/9024 |

* cited by examiner

*Primary Examiner* — Stephen S Hong
*Assistant Examiner* — Darrin Hope
(74) *Attorney, Agent, or Firm* — Kim & Stewart LLP (57) ABSTRACT

Disclosed are various approaches for providing touchless visitor management. A visitor can complete a visitor registration process using a client device of the visitor and obtain a virtual badge credential to a visitor's device. A physical access control system credential as well as a visitor badge can also be obtained to the visitor's device.

20 Claims, 5 Drawing Sheets

DAY ZERO USER ACCESS TO ENTERPRISE RESOURCES

RELATED APPLICATION

Benefit is claimed under 35 U.S.C. 119(a)-(d) to Foreign Application Serial No. 202141031667 filed in India entitled "DAY ZERO USER ACCESS TO ENTERPRISE RESOURCES", on Jul. 14, 2021, by VMware, Inc., which is herein incorporated in its entirety by reference for all purposes.

BACKGROUND

Enterprises can be fast growing organizations that add employees and contract workers at a rapid pace. With each new employee or contract worker, a new user account is often required within enterprise information technology systems. Each new user account can be associated with one or more other accounts in third party systems or applications. The user account might require setup with a single sign-on (SSO) platform, or an identity manager. The user account can also require a new record within a directory service such as Active Directory. Information technology staff of the enterprise can also require provisioning a company issued computer, mobile device, or other devices. As the complexity of technology in enterprises advances, there is an increasing number of tasks required by information technology (IT) staff to set up a new employee or contract worker with the appropriate resources or applications within the enterprise.

Additionally, as transactions are increasingly touchless, users might desire touchless solutions for setting up their user accounts within the enterprise. In a legacy environment, when a new employee is being onboarded, they might be provided a temporary password for their user account on a label or sheet of paper. Then the user is required to change their password after an initial login to their user account. Additionally, the IT administrator may have to manually setup various user accounts for the user with various services utilized by the enterprise. Accordingly, day zero tasks for new employees or contract workers can be a highly inefficient and time-consuming process, costing enterprise time and resources.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of a system that facilitates day zero access to enterprise resources for employees and workers who are being onboarded. In some environments, when a new employee or worker is being onboarded, a user account within a directory service and/or identity manager is created. When the user account is created, a record within the directory service is created. The user account often requires an initial password to be generated or defined by an information technology (IT) administrator. A username and the initial password are often provided to a new user via an email to the user's personal email account or provided on paper.

Providing an initial password to the user in this way can result in a security hole. In one aspect, if the initial password is provided to the user's personal email account, the password is provided to an email service over which the enterprise has no control. In another aspect, the initial password being simply written down or printed for the user creates a risk that someone other than the user has access to the password. Additionally, providing the password on paper means that the experience is not a touchless experience, which might be desirable to the enterprise.

A user in an enterprise might also require access to various other applications and services provided by the enterprise, some of which can be third party services. Accordingly, an IT administrator might be required to provision the user for access to these applications for the user. These applications might require an initial setup or an authentication token from an identity manager utilized by the enterprise to provide access to a user of the enterprise.

Examples of this disclosure can allow a user to utilize a one-time use link, or a "magic link," that allows the user to access a portal in which he or she can create a password, initialize multi-factor authentication, and/or register with an identity provider utilized by the enterprise. The portal accessible using the link can also allow the user to initialize or provision applications or services utilized by the enterprise. In some cases, the link can allow the user enroll a client device with an enterprise mobility management (EMM) platform utilized by the enterprise.

Figure 1:
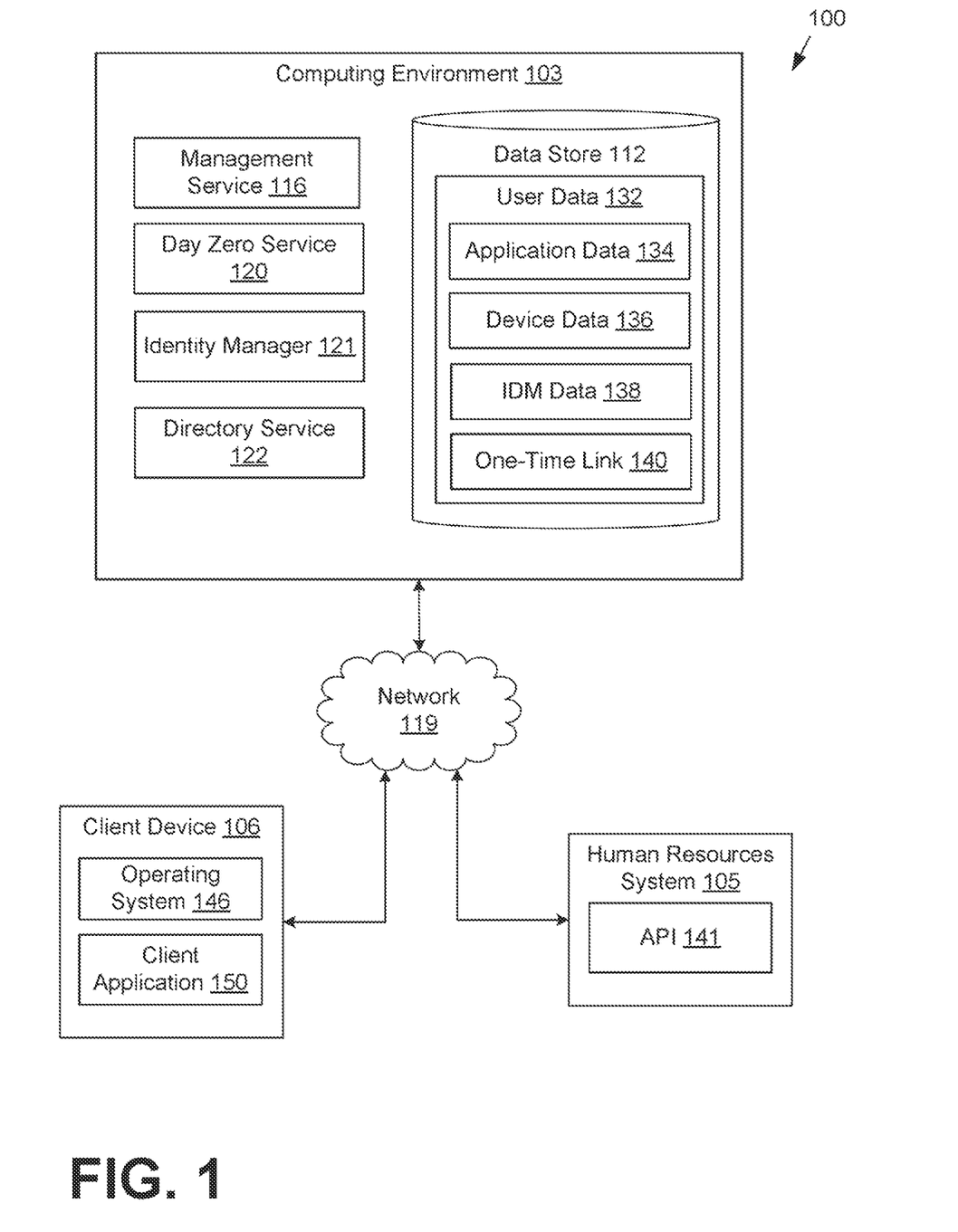
FIG. 1 is a schematic block diagram depicting an example implementation according to various examples of the disclosure.

FIG. 1 illustrates an example of a networked environment 100 according to examples of the disclosure. In the depicted network environment 100, a computing environment 103 is in communication with at least one client device 106 and a human resources system 105 over a network 119.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The computing environment 103 and human resources system 105 can be a computing environment that is operated by an enterprise, such as a business or other organization. The computing environment 103 and human resources system 105 include a computing device, such as a server computer, that provides computing capabilities. Alternatively, the computing environment 103 and human resources system 105 can employ multiple computing devices that are arranged in one or more server banks or computer banks. In one example, the computing devices can be located in a single installation. In another example, the computing devices for the computing environment 103 and human resources system 105 can be distributed among multiple different geographical locations. In one case, the computing environment 103 and human resources system 105 include multiple computing devices that together can form a hosted computing resource or a grid computing resource. Additionally, the computing environment 103 and human resources system 105 can operate as an elastic computing resource where the allotted capacity of computing-related resources, such as processing resources, network resources, and storage resources, can vary over time. In other examples, the computing environment 103 and human resources system 105 can include or be operated as one or more virtualized computer instances that can be executed to perform the functionality that is described herein.

Various applications or other functionality can be executed in the computing environment 103. Also, various data can be stored in a data store 112 that can be accessible to the computing environment 103. The data store 112 can be representative of a plurality of data stores 112. The data stored in the data store 112 can be associated with the operation of the various applications or functional entities described below.

The components executed on the computing environment 103 can include a management service 116, a day zero service 120, an identity manager 121, a directory service 122, and other applications, services, processes, systems, engines, or functionality not discussed in detail herein.

In some implementations or in certain cases, devices associated with users in a corporate environment can be managed devices that are enrolled with a management service 116. The management service 116 can be executed by the computing environment 103 in an on-premises implementation or in another computing environment that is separate from the computing environment 103. The management service 116 can also be provided with access to information about users, physical resources, physical access credentials.

The management service 116 can monitor and oversee the operation of one or more client devices 106 by administrators. In some examples, the management service 116 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 116. The management service 116 can also initiate installation of configuration profiles that can be accessed by certain applications installed on a client device 106. In the context of this disclosure, and client device 106 associated with a user need not be enrolled as a managed device. Examples of the disclosure can facilitate enrollment of a client device 106 with a management service 116 utilized by the enterprise by way of the one-time use link.

The data stored in the data store 112 can include user data 132. User data 132 can include, for example, application data 134, device data 136, identity manager data 138, or IDM data 138, one-time link 140, and potentially other information to support the execution of the management service 116, day zero service 120. The data store 112 can include device records and visitor user data. The data store 112 can also include various objects and data structures that are associated with an enterprise directory of user accounts and devices. Objects within the data store 112 can be organized into data structures, such as forests, trees, domains, organizational units, groups, partitions, or other organizational structures depending upon a directory service that might be utilized by the enterprise. Additionally, the directory can be replicated across more than one data store 112 for redundancy purposes. The inner-workings and specific structure of the directory are not shown or discussed herein, as they are not necessary for an understanding of examples of this disclosure. Additionally, the directory of users and devices might be separate from user data that is maintained or utilized by the management service 116, day zero service 120, identity manager 121, or directory service 122. However, the exact configuration of user data and device data is not necessary for a full understanding of examples of the disclosure.

Application data 134 can include information about applications utilized by the enterprise to which the user is provided access. Applications can be provided as a third party service. Accordingly, application data 134 can include authentication tokens, credentials, or entitlements, or other data associated with applications that are provided to a user by the enterprise. The application data 134 can also identify the applications that are provided by the enterprise to which the user is provided access.

Device data 136 can include information about a client device associated with a user. When a user registers with an enterprise, or is hired by the enterprise as an employee or worker, the day zero service 120 can generate a one-time link 140 corresponding to the user. The one-time link 140 can be provided to the user and direct the user to a portal provided by the day zero service 120 or the identity manager 121 that can allow the user to generate user account credentials, setup a secondary authentication factor, setup applications utilized by the enterprise, and perform user tasks associated with setting up user accounts within the enterprise. Additionally, the one-time link 140 can allow the user to enroll a client device 106 with a management service 116. Accordingly, device data 136 can include information about a device that is enrolled as a managed device with the management service 116. For example, the device data 136 can include information about the operating system, device type, device capabilities, and other data about a client device 106 that is being used by the visitor to register as a visitor.

Identity manager data 138 can include data about a user that is utilized in conjunction with the identity manager 121. The identity manager data 138 can include a username, password, and potentially other authentication factors that are utilized by the user to access the identity manager 121 and/or other services provided by the enterprise. In one example, a directory service 122 can federate user authentication to the identity manager 121. Additionally, other services utilized by the enterprise can also federate authentication to the identity manager 121. Accordingly, the identity manager 121 can store authentication tokens and other data that facilitates access to third party services for which authentication is federated or delegated to the identity manager 121.

A one-time link 140 can represent a link to a portal, such as a web page or series of web pages, at which a user can define a password within the directory service 122 or identity manager 121, define secondary authentication credentials, select one or more applications to be accessed by the user, enroll a client device 106 with the management service 116, and perform other tasks to setup one or more user accounts associated with the enterprise. The portal can be provided by the day zero service 120, and the one-time link 140 can also be generated by the day zero service 120 and stored in the data store 112 in association with a user account.

The directory service 122 can represent an enterprise user directory such as Active Directory. The directory service 122 can authenticate and authorize users of Windows devices in a Windows domain type network. The directory service 122, in conjunction with the operating system of a client device 106 that is joined to the domain, can assign and enforce security and other usage policies on client devices 106. The directory service 122 can also facilitate management of data and peripherals that are also used and deployed within an enterprise computing environment.

The directory service 122 and operating system of a client device 106 can allow the deployment of group policy rules, or group policies, to client devices 106. The group policy rules can allow for control of certain aspects of a client device 106, such as VPN policies, whether a client device 106 should encrypt its mass storage resources, whether a non-administrator user has access to certain operating system settings, LAN settings, password policies, which applications are installed on the client device, whether the user can install certain applications on the client device 106, and other policies that can control, restrict, or enable certain features of the operating system of a client device 106. The directory service 122 can also be utilized to authenticate a user's access to resources within the enterprise or that are external to the enterprise if the directory service 122 operates as or in conjunction with a single sign-on (SSO) portal, such as the identity manager 121.

The identity manager 121 can represent an SSO portal that can facilitate authentication of users of the enterprise. The directory service 122 can federate authentication to the identity manager 121 in some examples. The directory service 122 can also perform its own authentication. The identity manager 121 can also authenticate user access to other applications, such as source code repositories, messaging applications, productivity applications, cloud services, and other applications that can be provided by the enterprise to users but that may be hosted by third parties.

The day zero service 120 represents a service that can orchestrate day zero activities on behalf of the enterprise for a user. The day zero service 120 can communicate with a human resources system 105 to detect a new employee or new contract worker. The human resources system 105 can be a third-party system that facilitates hiring and other human resources tasks. The human resources system 105 can represent a cloud-based financial management and human resources management system that is utilized by the enterprise for management human resource functions.

The day zero service 120 can utilize an API 141 provided by the human resources system 105 to detect when a new employee record or a new user record is added, which indicates that a new employee or worker has been hired. Upon detecting a new user record in the human resources system 105, the day zero service 120 can generate a one-time link 140 that can facilitate onboarding of the user on their first day, or on day zero. The human resources system 105 can be operated by a third party as a network-accessible service via the API 141. The API 141 can permit the enterprise to make programmatic calls to access employee data in the human resources system 105, such as detecting when a new employee record is added after the employee or worker is hired. The API 141 can also permit the day zero service 120 to access employee data, such as organization, role, position, name, demographic information, and other data about the employee.

The day zero service 120 can create a record corresponding to a new employee with directory service 122 utilized by the enterprise upon detecting the new employee in the human resources system 105. The new record within the directory service can be assigned to a user group within the directory service 122 that is designated for newly hired users. These users can be assigned a temporary password by the directory service 122 or no password by the directory service 122. In the case of no password being assigned to the user, the user can be prompted to create a password the first time the user accesses his or her user account.

The day zero service 120 can also create a user account for the user identified in the human resources system 105 within the identity manager 121. The enterprise can utilize an identity manager 121 to federate user authentication from the directory service 122 and for other applications and third-party services that are provided by the enterprise to its users. In this scenario, the user's authentication credentials can be held by the identity manager 121. Accordingly, the day zero service 120 can cause the identity manager 121 to generate a temporary password or prompt to create a password the first time the user accesses his or her user account within the identity manager 121.

The human resources system 105 represents one or more computing devices operated by or on behalf of a third-party human resources application. The human resources system 105 can provide an API 141 that can be accessed by other applications associated with the enterprise, such as the day zero service 120. As noted above, the human resources system 105 can provide various features utilized by the enterprise for human resources.

The client device 106 can represent a computing device or mobile device associated with a visitor. The client device 106 includes, for example, a processor-based computer system. According to various examples, a client device 106 can be in the form of a desktop computer, a laptop computer, a personal digital assistant, a mobile phone, a smartphone, or a tablet computer system.

In one implementation, the client device 106 can execute an operating system 146. The operating system 146 can represent a mobile or desktop operating system such as iOS™ Android, Windows™ or other computing environments. The operating system 146 can allow the client device 106 to be enrolled as a managed device with the management service 116. In some examples, a management client or a management component can also be installed on the client device 106 that facilitates management of the client device 106. The operating system 146 can provide one or more APIs that facilitate management of the client device 106. The management client or management component can be installed with elevated or administrative privileges and enforce compliance rules that are specified by the management service 116. Additionally, the management component or management client can install profiles, certificates, applications, and carry out other management tasks on the client device 106 on behalf of the management service 116.

The client device 106 can run client applications 150 that are installed on the client device 106. Client applications 150 can be utilized to access third party services. The one or more other client applications 150 can be provisioned by the management service 116 or installed by the user. In one scenario, the day zero service 120 can provide a portal through which a user can enroll his or her device as a managed device with the management service 116. The portal can also allow the user to select client applications 150 that are installed on the client device 106. Upon selecting client applications 150 using the portal, the management service 116 can cause the selected client applications 150 to be installed on the client device 106 that has been enrolled as a managed device with the management service 116. Additionally, the day zero service 120 can cause the identity manager 121 to generate an authentication token on behalf of the user for the selected client applications 150 if there is a corresponding authentication credential that is required to use the client applications 150.

In some instances, an application that is only a web-accessible application can be selected or provisioned by the user through the portal. For the web-accessible applications, the day zero service 120 can cause the identity manager 121 to generate an authentication token on behalf of the user for the selected web-accessible applications if there is a corresponding authentication credential that is required to use the web-accessible application.

Figure 2:
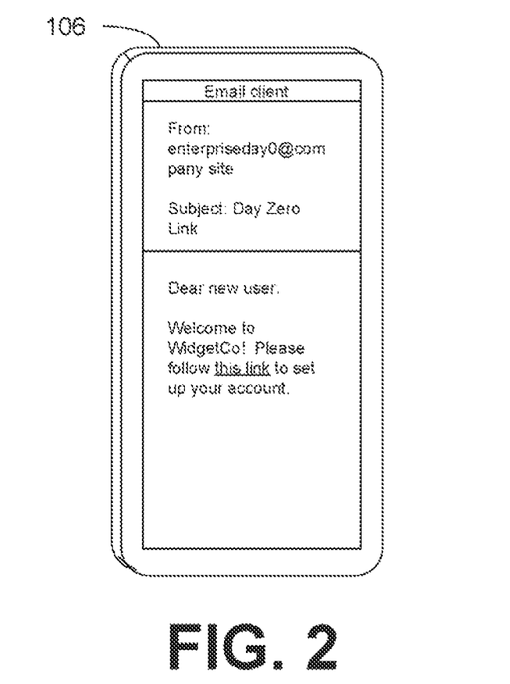
FIG. 2 is an example of the visitor application executed by a client device according to examples of the disclosure.

Referring next to FIG. 2, shown is an example of a client device 106 and a one-time link 140 that can be provided to a user by the day zero service 120. When an employee record or user record is added to the human resources system 105, indicating that a new employee or user is being hired by the enterprise, the day zero service 120 can detect the new employee or user using the API 141 provided by the human resources system 105. In response to detecting the new employee or user, the day zero service 120 can generate a one-time link 140 and assign the one-time link 140 the new employee or user.

The one-time link 140 can be provided to the user by the day zero service 120. The one-time link 140 can be emailed or otherwise messaged to a client device 106 associated with the user. The one-time link 140 can point to a portal provided by the day zero service 120 through which the user can complete setup of a user account within the enterprise. The portal can allow the user to complete setup of the user account, select or install applications provided by the enterprise, setup additional or secondary authentication factors, and perform other tasks that might be needed or required for the user to complete setup of the user account. For example, the portal can include a link to human resources tools that allow an employee to enroll in employee benefits, time-tracking, or other resources and tools that can be provided by the enterprise.

As shown in the example of FIG. 2, the one-time link 140 generated for the user can be emailed to an email address associated with the user that is different from the user's corporate email address. The email address can be stored in the human resources system 105 and associated with the employee's pre-hiring record within the human resources system 105. The one-time link 140 can also be sent to the user's client device 106 via text messaging or another messaging channel that is available to the day zero service 120 or the human resources system 105.

The one-time link 140 can be stored in the data store 112 and associated with a user record created within the directory service 122. The day zero service 120 can cause a new user record to be created within the directory service 122 upon detecting that a new employee or worker has been hired. The day zero service 120 can also expire the one-time link 140 upon detecting that the one-time link 140 has been used. In this way, the security of the employee onboarding process can be improved because the portal provided by the day zero service 120 at the one-time link 140 can require the user to create an authentication credential. Accordingly, the user's credential is not known to the administrator because the one-time link 140 does not include the password of the user.

Additionally, the one-time link 140 can include a security token or a security string that can be signed by the day zero service 120, which limits the ability of a malicious actor from generating a valid one-time link 140 that can be utilized to access a portal provided by the day zero service 120 to perform zero day activities. For example, the day zero service 120 can generate a one-time link 140 that includes a unique identifier as a URL query string. The unique identifier can be signed or encrypted using an encryption algorithm. When accessed, the day zero service 120 can validate the one-time link 140 accessed by a client device 106 to validate that the one-time link 140 that is being accessed is valid. Only after validating the link, the day zero service 120 can provide a portal corresponding to a user associated with the one-time link 140. If the one-time link 140 cannot be validated by the day zero service 120, the day zero service 120 can return an error page to the client device 106 that is attempting to access the invalid link.

Figure 3:
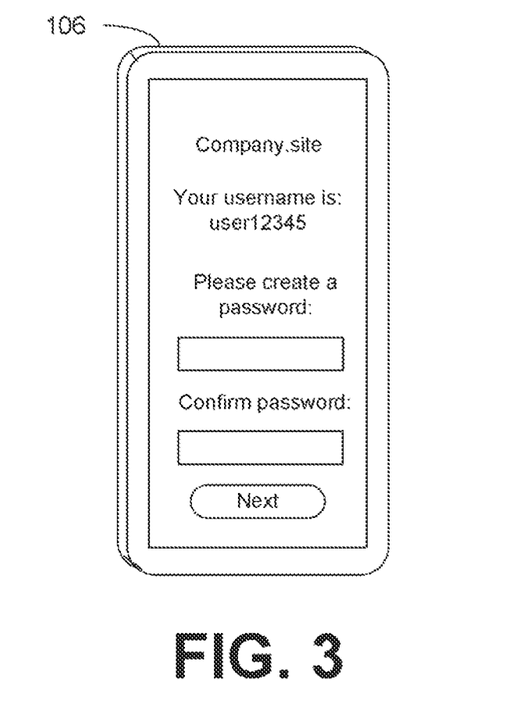
FIG. 3 is an example of the visitor application executed by a client device according to examples of the disclosure.

Referring next to FIG. 3, shown is an example portal that can be provided by the day zero service 120 when a user accesses a one-time link 140 that is provided to the user. Again, the one-time link 140 can be provided to the user to a client device 106, and the user can access the one-time link 140 to perform user account setup tasks, application selection and setup, and other first day activities. The portal provided by the day zero service 120 can comprise a series of pages or a workflow that allow the user to perform various tasks.

For example, the user can setup a password for a user account in the directory service 122 or the identity manager 121. The user can also setup a secondary authentication factor for a user account. In some cases, the directory service 122 can federate user authentication to an identity manager 121 that provides single sign-on (SSO) capabilities to users of the enterprise or that have accounts in the directory service 122. In addition to setting up a password, the portal can also allow the user to setup a secondary authentication factor associated with a user account in the identity manager 121 or the directory service 122.

Figure 4:
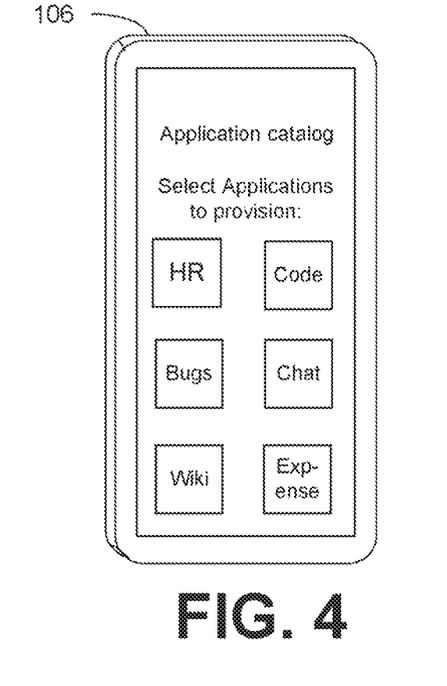
FIG. 4 is an example of the visitor application executed by a client device according to examples of the disclosure.

Referring next to FIG. 4, shown is an example portal that can be provided by the day zero service 120 when a user accesses a one-time link 140 that is provided to the user. Again, the one-time link 140 can be provided to the user to a client device 106, and the user can access the one-time link 140 to perform user account setup tasks, application selection and setup, and other first day activities. The portal provided by the day zero service 120 can comprise a series of pages or a workflow that allow the user to perform various tasks.

In the example of FIG. 4, the portal can allow the user to select applications for provisioning, setup, or installation on his or her client device 106. In some examples, authentication can be provided for a particular application by the identity manager 121. Accordingly, when a user selects an application, the portal can direct the client device 106 to a site corresponding to the application, which can in turn redirect the client device 106 to the identity manager 121 so that the user can authenticate his or her credentials and obtain an authentication token for the application.

In some examples, upon selecting an application, the portal can redirect the client device 106 to a site or application through which the user installs client applications 150 on the client device 106. For example, the portal can redirect the client device 106 to an application or a listing in an application through which the user can install the selected client applications 150 on the client device 106. As another example, the portal can instruct the management service 116 to install the client applications 150 on the client device 106.

In some examples, the portal can provide a link or workflow that causes a client device 106 of the user to be enrolled as a managed device with the management service 116. In one scenario, a link can cause a management profile to be downloaded to a client device 106 of the user. The client device 106 can be the user's device or a device that is issued by the enterprise to the user. The management profile can cause the operating system of the client device 106 to enroll the client device 106 as a managed device with the management service 116.

Figure 5:
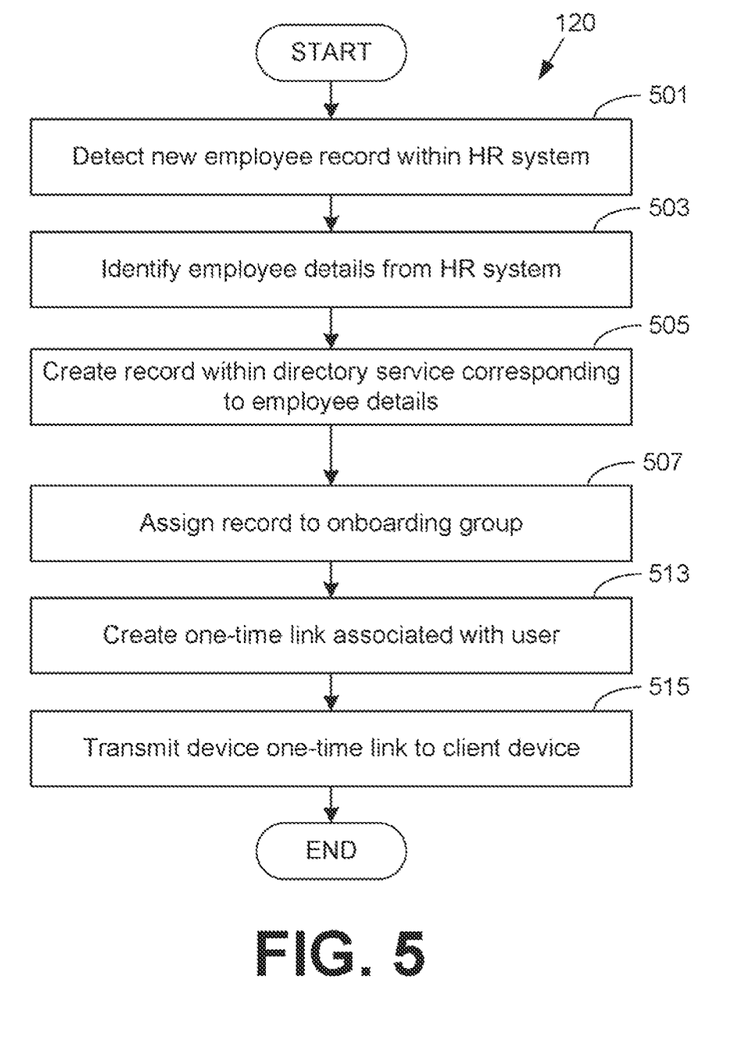
FIG. 5 is a flowchart that illustrates functionality according to examples of the disclosure.

Referring next to FIG. 5, shown is a flowchart that illustrates functionality according to examples of the disclosure. At step 501, the day zero service 120 detects a new employee record within the human resources system 105. As mentioned earlier, the day zero service 120 can utilize an API 141 provided by the human resources system 105 to detect when a new employee record or a new user record is added. At step 503, the day zero service 120 identifies employee details from the human resources system 105. As mentioned earlier, the API 141 can also permit the day zero service 120 to access employee data, such as organization, role, position, name, demographic information, and other data about the employee.

At step 505, the day zero service 120 creates a record within the directory service 122 corresponding to the employee details. At step 507, the day zero service 120 assigns the record to an onboarding group. At step 513, the day zero service 120 creates a one-time link 140 associated with the user. At step 515, the day zero service 120 transmits the one-time link 140 to the client device 106. After step 515, the flowchart of FIG. 5 ends.

The flowchart of FIG. 5 shows examples of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart of FIG. 5 shows a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

Figure 6:
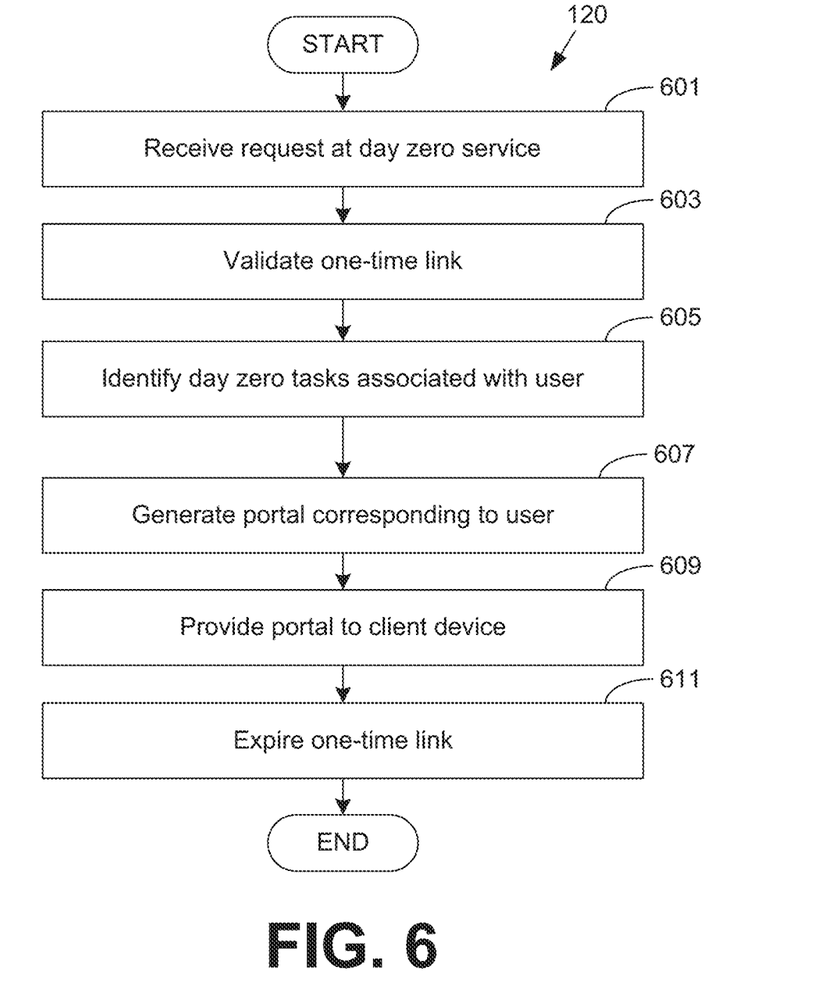
FIG. 6 is a flowchart that illustrates functionality according to examples of the disclosure.

Referring next to FIG. 6, shown is a flowchart that illustrates functionality according to examples of the disclosure. At step 601, a request is received at the day zero service 120. At step 603, the day zero service 120 validates a one-time link 140. As mentioned earlier, the day zero service 120 can validate the one-time link 140 accessed by a client device 106 to validate that the one-time link 140 that is being accessed is valid.

At step 605, the day zero service 120 identifies day zero tasks associated with the user. As mentioned earlier, the user can access the one-time link 140 to perform user account setup tasks, application selection and setup, and other first day activities. At step 607, the day zero service 120 generates a portal corresponding to the user. At step 609, the day zero service 120 provides the portal to the client device 106. At step 611, the day zero service 120 expires the one-time link 140. After step 611, the flowchart of FIG. 6 ends.

The client device 106, computing environment 103, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 116, day zero service 120 visitor application 148, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

What is claimed is:

1. A system for enabling a new employee of an enterprise to access resources of the enterprise, the system comprising:
at least one computing device including at least one processor and memory, wherein the at least one processor is configured to execute instructions stored in the memory to at least:
invoke an application programming interface (API) of a human resources system to acquire a new employee record from a data store associated with the human resources system, the new employee record indicating that the new employee has been hired;
create a record corresponding to the new employee in a directory service utilized by the enterprise, and assign the record in the directory service to a user group within the directory service that is designated for new employees;
generate a one-time link that includes a unique identifier as a uniform resource locator (URL) query string, the one-time link providing access to a portal of the enterprise that includes an application catalog comprising a plurality of applications that may be installed on a client device of the new employee;
transmit the one-time link to the client device and then, upon the new employee accessing the one-time link at the client device, validate the one-time link and then expire the one-time link; and
provide the portal to the client device after validating the one-time link and then redirect the client device to a site or access application through which a selected application of the application catalog is installed onto the client device.

2. The system of claim 1, wherein an identity manager of the system provides the portal to the client device, the identity manager also providing sign-on capabilities to the new employee.

3. The system of claim 2, wherein the at least one processor is further configured to execute the instructions stored in the memory to at least:
prompt, by the identity manager, the new employee for a password via the portal, the password being for an account with the enterprise.

4. The system of claim 2, wherein the at least one processor is further configured to execute the instructions stored in the memory to at least:
facilitate, by the identity manager, setup of a secondary authentication factor via the portal, the secondary authentication factor being for an account with the enterprise.

5. The system of claim 2, wherein the at least one processor is further configured to execute the instructions stored in the memory to at least:
generate, by the identity manager, an authentication token for the new employee, the authentication token corresponding to the selected application.

6. The system of claim 1, wherein a management service of the system monitors operation of the client device, and the at least one processor is further configured to execute the instructions stored in the memory to at least:
enroll, by the management service via the portal, the client device to be a managed device with the enterprise.

7. The system of claim 6, wherein enrolling the client device comprises causing a management profile to be downloaded to the client device.

8. A method for enabling a new employee of an enterprise to access resources of the enterprise, the method comprising:
invoking an application programming interface (API) of a human resources system to acquire a new employee record from a data store associated with the human resources system, the new employee record indicating that the new employee has been hired;
creating a record corresponding to the new employee in a directory service utilized by the enterprise, and assigning the record in the directory service to a user group within the directory service that is designated for new employees;
generating a one-time link that includes a unique identifier as a uniform resource locator (URL) query string, the one-time link providing access to a portal of the enterprise that includes an application catalog comprising a plurality of applications that may be installed on a client device of the new employee;
transmitting the one-time link to the client device and then, upon the new employee accessing the one-time link at the client device, validating the one-time link and then expiring the one-time link; and
providing the portal to the client device after validating the one-time link and then redirecting the client device to a site or access application through which a selected application of the application catalog is installed onto the client device.

9. The method of claim 8, further comprising:
prompting the new employee for a password via the portal, the password being for an account with the enterprise.

10. The method of claim 8, further comprising:
facilitating setup of a secondary authentication factor via the portal, the secondary authentication factor being for an account with the enterprise.

11. The method of claim 8, further comprising:
enrolling the client device via the portal to be a managed device with the enterprise.

12. The method of claim 11, wherein enrolling the client device comprises causing a management profile to be downloaded to the client device.

13. The method of claim 8, further comprising:
generating an authentication token for the new employee, the authentication token corresponding to the selected application.

14. The method of claim 8, wherein the plurality of applications including the selected application are installed onto the client device through the site or access application.

15. A non-transitory computer-readable medium comprising machine-readable instructions, wherein when executed by at least one processor of at least one computing device, the machine-readable instructions cause the at least one computing device to at least:
invoke an application programming interface (API) of a human resources system to acquire a new employee record from a data store associated with the human resources system, the new employee record indicating that a new employee has been hired;
create a record corresponding to the new employee in a directory service utilized by an enterprise, and assign the record in the directory service to a user group within the directory service that is designated for new employees;
generate a one-time link that includes a unique identifier as a uniform resource locator (URL) query string, the one-time link providing access to a portal of the enterprise that includes an application catalog comprising a plurality of applications that may be installed on a client device of the new employee;

transmit the one-time link to the client device and then, upon the new employee accessing the one-time link at the client device, validate the one-time link and then expire the one-time link; and provide the portal to the client device after validating the one-time link and then redirect the client device to a site or access application through which a selected application of the application catalog is installed onto the client device.

16. The non-transitory computer-readable medium of claim 15, wherein the machine-readable instructions further cause the at least one computing device to at least:

prompt the new employee for a password via the portal, the password being for an account with the enterprise.

17. The non-transitory computer-readable medium of claim 15, wherein the machine-readable instructions further cause the at least one computing device to at least:

facilitate setup of a secondary authentication factor via the portal, the secondary authentication factor being for an account with the enterprise.

18. The non-transitory computer-readable medium of claim 15, wherein the machine-readable instructions further cause the at least one computing device to at least:

enroll the client device via the portal to be a managed device with the enterprise.

19. The non-transitory computer-readable medium of claim 18, wherein enrolling the client device comprises causing a management profile to be downloaded to the client device.

20. The non-transitory computer-readable medium of claim 15 wherein the machine-readable instructions further cause the at least one computing device to at least:

generate an authentication token for the new employee, the authentication token corresponding to the selected application.

* * * * *